Patented Apr. 17, 1934

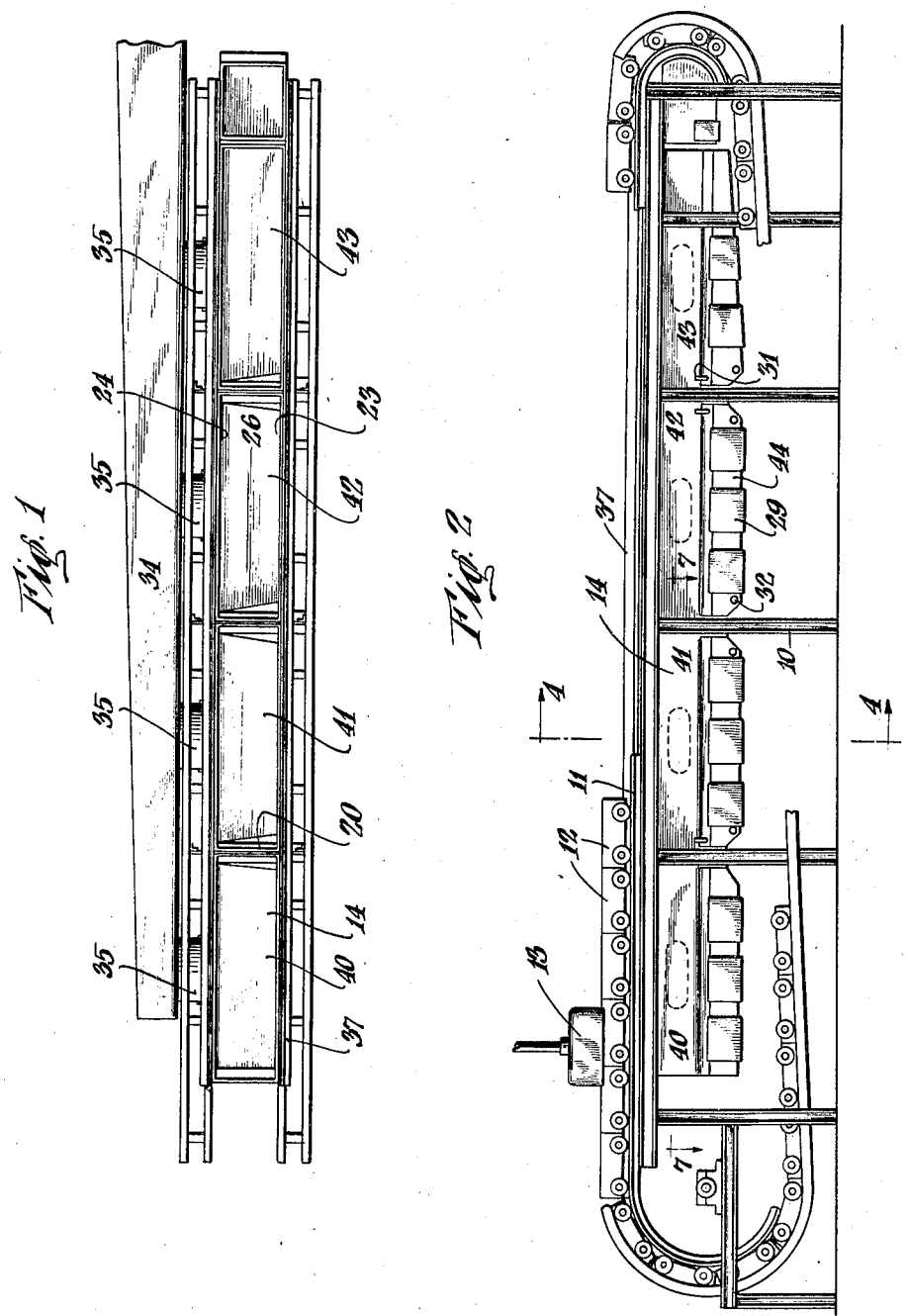

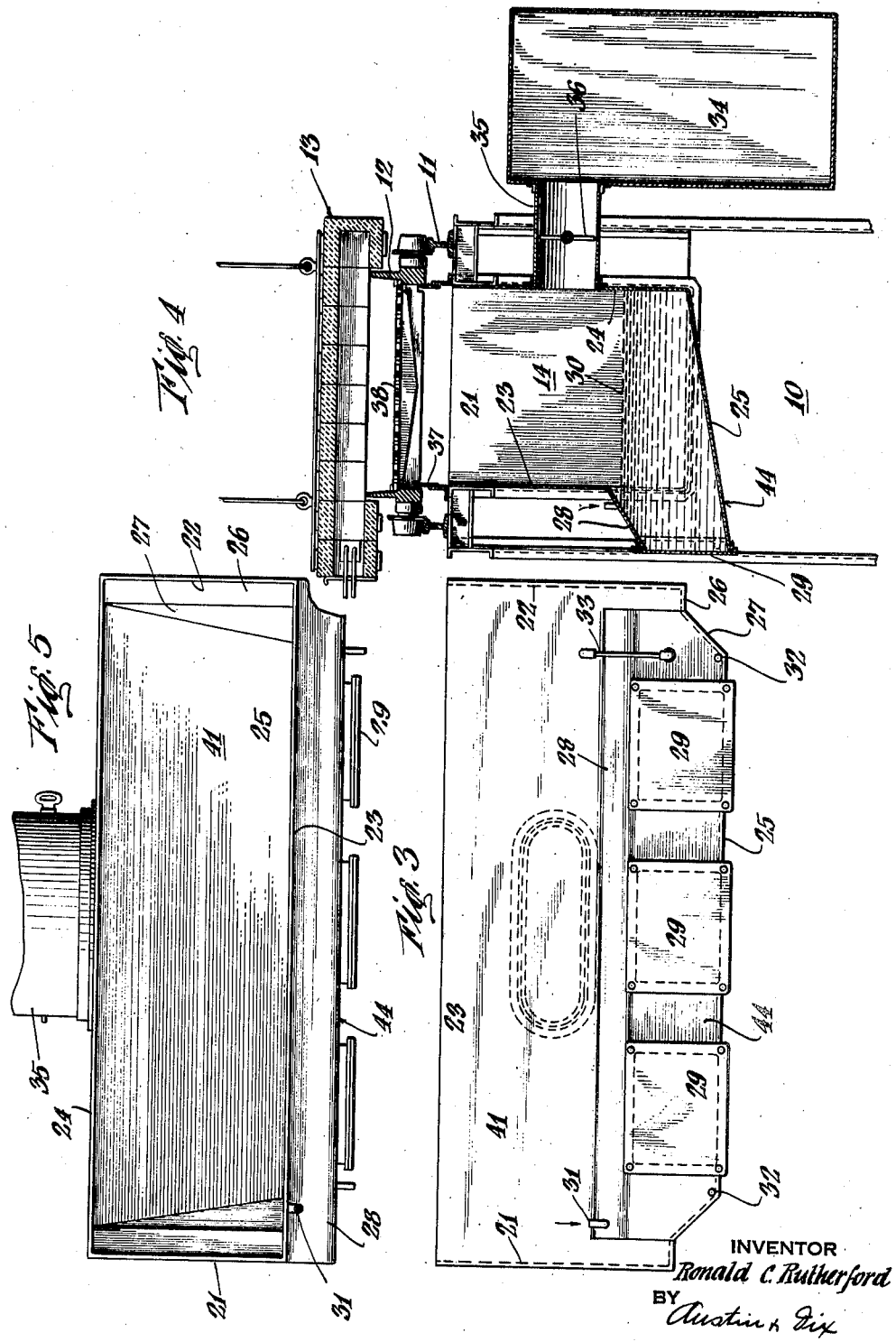

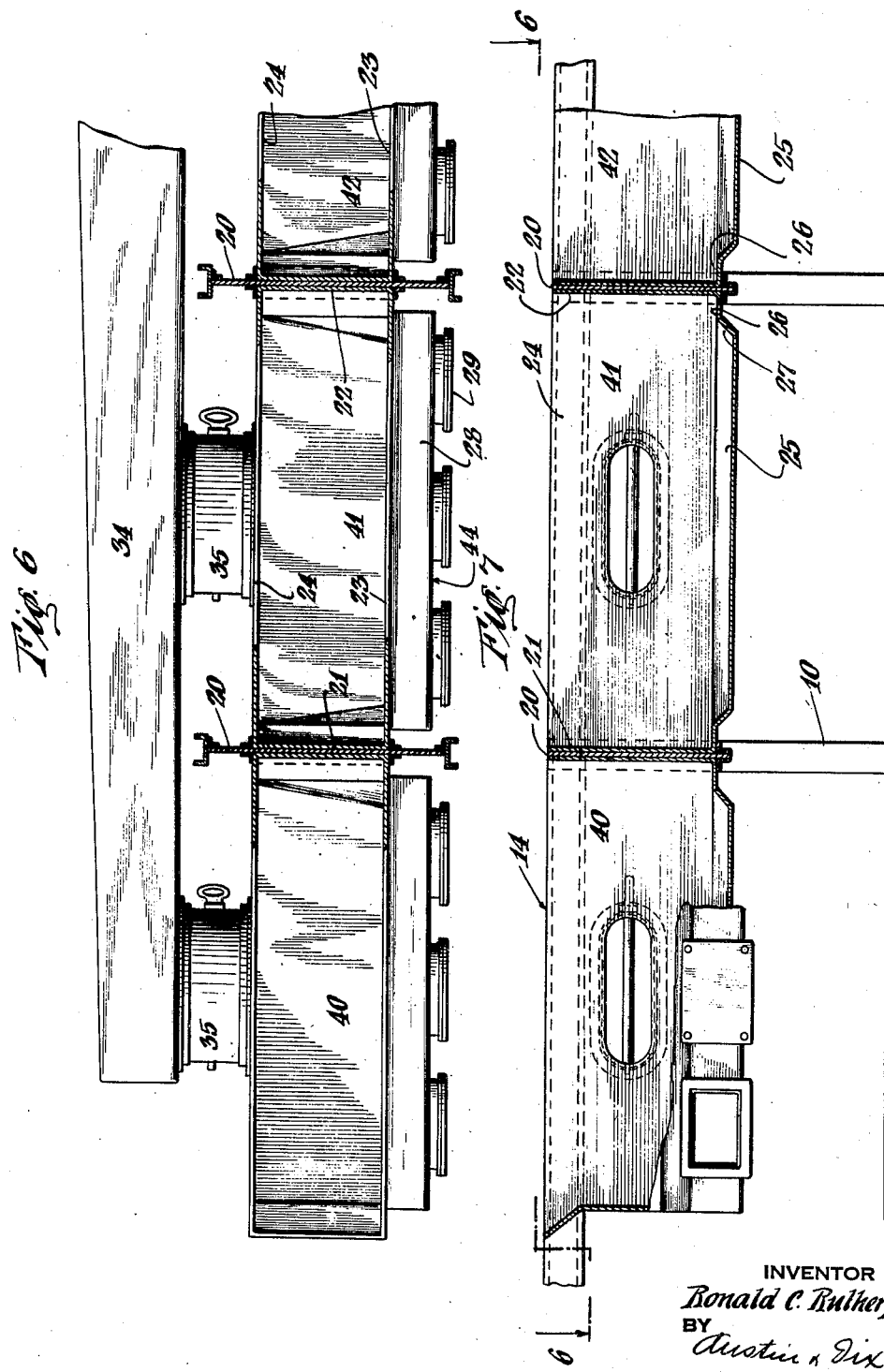

1,954,951

UNITED STATES PATENT OFFICE 1,954,951

METHOD AND APPARATUS FOR REFINING METALS

Ronald C. Rutherford, Chihuahua, Mexico, assignor to American Smelting and Refining Company, New York, N. Y., a corporation of New Jersey Application April 11, 1932, Serial No. 604,404

8 Claims. (Cl. 75—65)

The invention relates to metallurgical processes, such as the refining of lead, and also to sintering machines carrying out such processes.

According to a preferred form of the invention, the molten impure lead, which drops through the bed of a sintering machine into the wind box, is caused to granulate by providing a pool of water in the bottom of the wind box. This facilitates the removal of the lead which drops out of the sintering bed to a very great degree.

The sintering machine used may be provided with a special form of wind box especially adapted to receive the lead and to hold water. The side walls of the wind box may be made vertical and all projections eliminated on which the lead may catch. Suitable inlets and outlets may be provided for the water supply and withdrawal.

According to a preferred manner of practicing the invention, the lead ore or concentrates may be single-sintered or double-sintered and the impure lead recovered from the wind box, as above described. The lead collected in the wind box, in the case of an ore of high lead content and containing impurities, such as gold, silver, copper, arsenic, antimony, bismuth and tin, has been found to be greatly enriched in the percentage of gold, silver and bismuth, and at the same time this lead has been found to have its copper, arsenic, antimony and tin content greatly reduced. The gold, silver and bismuth may be recovered from the impure wind box lead according to any desired process.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents a plan view of a sintering machine according to the invention with the pallets removed;

Fig. 2 represents a side elevation of such a sintering machine;

Fig. 3 represents a detail showing a single section of the wind box;

Fig. 4 is a section through the sintering machine taken on the line 4—4 of Fig. 2;

Fig. 5 is a plan view of the section shown in Fig. 3;

Fig. 6 is an enlarged sectional view illustrating the arrangement of the sections of the wind box, taken on the line 6—6 of Fig. 7; and Fig. 7 is a side elevation of the part of the machine shown in Fig. 6.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the sintering machine comprises in general a frame 10 made up of suitable structural steel, tracks 11 upon which pallets 12 run. Suspended at one end is a muffle 13 and underneath the top tracks is the wind box 14.

It will be understood that the charge is fed by means (not shown) at the left hand end of the machine (Fig. 2) onto the pallets 12. These pallets run along the tracks 11 under the muffle 13. The muffle 13 contains suitable ignition apparatus (not shown) which ignites the charge on the pallets. This charge continues to burn as the pallets travel over the wind box 14 until the pallets reach the right hand end, whence the pallets dump the charge and return along the lower tracks to the left hand end where they again receive the charge to be sintered.

The wind box 14 is made up of suitable sections, indicated by 40, 41, 42 and 43. These sections are made up of suitable sheet steel and are separate, being supported by the partitions 20 (Figs. 6 and 7). These partitions are conveniently supported by the adjacent channel legs as shown.

The sections 41 and 42 may be substantially identical in construction, while the first section 40 and the last section 42 may differ slightly. The section 41, for example, comprises vertical side walls 23 and 24, and vertical end walls 21 and 22 which are secured respectively to the partitions 20.

Adjacent the end walls 21 and 22 bottom walls 26 are provided which are connected by sloping walls 27 to the sloping bottom wall 25, as illustrated, particularly in Figs. 3, 4 and 5.

The sloping wall 25 extends beyond the body of the wind box forming an extended portion, indicated by 44. The extended portion is provided with a sloping top wall 28 and removable cleaning plates 29.

For supplying water to the various sections, supply pipes 31 and outlet pipes 32 are provided. The water level is indicated by 30 in Fig. 4 and may be about 14 inches from the bottom in some types of sintering machines. If desired, each section may be provided with a gauge glass 33 by which the height of the water may be observed. If desired, the first section 40 may not be supplied with water, especially if the process is so arranged that no great amount of metal drops out over this portion of the wind box.

For supplying suction to the various sections of the wind box a flue 34 is provided which is connected to a suitable suction blower as is well understood in the art. This flue may deliver the fume or other products of the sintering machine to a suitable bag house or any suitable metallurgical apparatus. Each section is connected to the flue 34 by a separate branch 35 having its own damper mechanism 36. By these dampers the amount of suction in each section may be separately controlled.

If desired, a suitable sealing device, indicated by 37, may extend from the upper end of the wind box sections into close proximity of the bodies of the pallets 12. The grate bars on which the charge rests are indicated by 38. These sealing devices are for the purpose of insuring all of the air sucked in by the wind box passing through the bed of charge on the pallets.

It will be noted that the walls of the wind box sections are generally vertical and drop abruptly from the sides of the pallets. They are free of all projections so that none of the molten metal which drops through the bed of charge can be deposited or thus clog up the machine. The metal as it drops from the charge becomes granulated in the water, whence it may be removed from time to time by removing the cleaning plates 29.

Thus at predetermined periods, the sintering machine must be stopped, the water drawn off and the plates 29 removed, whence the granulated metal may be removed for further treatment, as will be described hereinafter.

It has been found that in the process of double-sintering lead ores and concentrates on first and second sintering machines, under certain conditions a considerable amount of metallic lead melts and drops out of the sintering beds, falling into wind boxes of the second machine. Sometimes small amounts of metallic lead are found in the wind boxes of the first machine.

The amount of lead collected is governed by the lead content of the charge, the method of roasting and the various reactions between the different compounds of lead, such as lead sulphate, lead sulphide, lead oxide, etc.

Since it has been found necessary at times to add carbon either in the form of zinc plant residues, or coke breeze, to the charge to improve ignition, some of the lead in the form of the oxide is reduced, producing metallic lead.

Although the process according to the invention may be carried out with different kinds of ores and having different percentage compositions of different materials, the following example will serve for the purpose of illustrating the invention:

In one type of charge, the lead content ran from 40 to 43%. From 2 to 8% of this lead was collected in the wind box, the average being in the neighborhood of 5%.

After the lead ore or concentrates is treated by the sintering machines, the residue delivered from the bed of the machine is treated in the usual manner, such as by a blast furnace to recover the lead bullion.

The following table gives an example of the percentages of the various metals found in the regular bullion and in the wind box lead:

|  | Au ozs. | Ag ozs. | Percent Pb | Percent Cu | Percent As | Percent Sb | Percent Bi | Percent Sn |
| --- | --- | --- | --- | --- | --- | --- | --- | --- |
| Windbox lead | 1.42 | 335.2 | 98.71 | .018 | .02 | None | .125 | None |
| Regular bullion | .22 | 94.1 | 99.22 | .024 | .14 | .26 | .027 | .027 |

It will be noted from the above that there is a very marked concentration of gold, silver and bismuth in the wind box lead, while at the same time other impurities, namely, copper, arsenic, antimony and tin are either greatly reduced or entirely eliminated.

The various impurities are then recovered from the regular bullion lead in the ordinary way, and similarly the several impurities are recovered from the wind box lead. However, since the gold, silver and bismuth are present in increased percentages in the wind box lead, a greatly improved recovery of these metals is possible.

Also since the impurities, such as gold, silver and bismuth are greatly concentrated in the wind box lead, it follows that the percentages are considerably decreased in the regular bullion, thus making it easier to refine or soften the regular bullion.

Thus according to the invention the wind box easily handles the lead that falls through. This lead granulates and is easily removed. Furthermore, the water in the wind box cools the gases by evaporation to some extent, cutting down the evil effects of high temperature on the bag house. In addition the separation of the wind box lead from the regular bullion has the effect of separating out and concentrating the impurities. Certain impurities, such as gold, silver and bismuth have their concentrations increased in the wind box lead, while other impurities, such as copper, arsenic, antimony and tin have their concentrations increased in the regular bullion.

While certain novel features of the invention have been disclosed and are pointed out in the annexed claims, it will be understood that various omissions, substitutions and changes may be made by those skilled in the art without departing from the spirit of the invention.

What is claimed is:

1. The method of refining impure lead containing such impurities as bismuth, gold, silver, copper, arsenic, antimony and tin, which comprises sintering the ore in a traveling bed, collecting the impure metallic lead which liquates out of the bed in a pool of water in the form of granules, recovering the gold, silver and bismuth from said granulated impure lead and recovering the other impurities from the lead remaining in the sinter bed.

2. The method of recovering impurities, such as bismuth, gold and silver, from lead ores which comprises sintering the ore in a traveling bed, collecting the impure metallic lead which liquates out of the bed in a pool of water in the form of granules, and recovering said impurities from such granulated impure lead.

3. The method of reducing the amount of such impurities, such as, copper, arsenic, antimony and tin contained in lead ores, which comprises sintering the ore in a traveling bed, collecting the metallic impure lead which liquates out of the bed in a pool of water in the form of granules and recovering the lead with said impurities greatly reduced.

4. The method of removing lead which drops into the wind box out of the bed on a sintering machine which comprises granulating the molten lead by letting it drop into water in the wind box and then removing the granulated lead from the wind box.

5. In a sintering machine, a conveyor, a stationary wind box under said conveyor and comprising vertical walls extending upwardly to the sides of said conveyor, said wind box having a sloping bottom wall inclining from one side to the other, a removable closure in the side of said wind box at the lower end of the bottom wall thereof for removing the material which collects in the bottom of the wind box, means for supplying water to said wind box and means for draining the water therefrom.

6. In a sintering machine, a conveyor adapted to carry a bed of charge, a stationary wind box under said conveyor, said wind box being free of projections on which metal liquating out of the bed can accumulate, means for removing the metal deposited in the bottom of the wind box, and means for supplying the bottom of said wind box with a pool of water into which the liquating metal may drop directly from said conveyor.

7. In a sintering machine, a conveyor, ignition apparatus above said conveyor a stationary wind box under said conveyor and comprising vertical walls extending upwardly to the sides of said conveyor and carrying seals therebetween, said wind box being divided into sections, each section having a sloping bottom wall inclining from one side to the other, removable doors in the side of each section at the lower end of the bottom wall thereof for removing the material which collects in the bottom of the wind box, a suction flue on the other side of said wind box, branches connecting said flue to said sections, damper mechanisms in said branches, means for supplying water to said wind box sections and means for draining water therefrom.

8. In a sintering machine, a conveyor, a stationary wind box under said conveyor and comprising vertical walls extending upwardly to the sides of said conveyor, said wind box being divided into sections, each section having a sloping bottom wall inclining to one side, a removable closure in each section for removing the material which collects in the bottom of the wind box, a flue, branches connecting said flue to said sections, damper mechanisms in said branches, means for supplying water to said wind box sections and means for draining water therefrom.

RONALD C. RUTHERFORD.